United States Patent
Matias et al.

(10) Patent No.: US 6,681,017 B1
(45) Date of Patent: *Jan. 20, 2004

(54) SIMPLIFIED SECURE SHARED KEY ESTABLISHMENT AND DATA DELIVERY PROTOCOLS FOR ELECTRONIC COMMERCE

(75) Inventors: Yossi Matias, Tel-Aviv (IL); Alain Jules Mayer, New York, NY (US); Abraham Silberschatz, Summit, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,492

(22) Filed: Sep. 3, 1997

(51) Int. Cl.[7] ................................................. H04L 9/00
(52) U.S. Cl. ........................ 380/277; 380/278; 713/171
(58) Field of Search ..................... 380/21, 49, 277–285; 713/201, 150–152, 170–171, 176, 172; 705/80

(56) References Cited

U.S. PATENT DOCUMENTS

| | | | | |
|---|---|---|---|---|
| 4,405,829 A | * | 9/1983 | Rivest et al. | 178/22.1 |
| 4,807,139 A | * | 2/1989 | Liechti | 364/464 |
| 5,268,962 A | * | 12/1993 | Abadi et al. | 380/21 |
| 5,479,509 A | * | 12/1995 | Ugon | 380/23 |
| 5,491,750 A | * | 2/1996 | Bellare et al. | 713/155 |
| 5,657,390 A | * | 8/1997 | Elgamal et al. | 709/313 |
| 5,949,876 A | * | 9/1999 | Ginter et al. | 705/80 |
| 6,424,718 B1 | * | 7/2002 | Holloway | 380/277 |

FOREIGN PATENT DOCUMENTS

| | | | | |
|---|---|---|---|---|
| EP | 973299 | * | 1/2000 | H04L/12/28 |
| WO | 9934553 | * | 7/1999 | H04L/9/08 |

OTHER PUBLICATIONS

"UK Firms Drive Trick Through US Encryption Law." Newsbytes News Network. Mar. 24, 1997.*
Bruce Schneier, Applied Cryptography, 2nd ed., p. 48, 1995.*
E. Rescorla and A. Schiffman, "The Secure HyperText Transport Protocol," Internet Draft, draft–ietf–wts–shttp–00.txt, Jul. 1995.

(List continued on next page.)

*Primary Examiner*—Ayaz Sheikh
*Assistant Examiner*—Hosuk Song (57) ABSTRACT

A number of protocols are disclosed for providing simplified security for a series of low-cost transactions carried out between a client and a server within an on-going client-server relationship. A key establishment protocol is used to generate a shared key which will be used by the client and server for the series of transactions. The client generates the shared key as a function of a client identifier, a server identifier and secret client information, encrypts the shared key using a public key of the server, and sends the encrypted shared key to the server. The server responds by incorporating server information into a response which is encrypted using the shared key and sent to the client. The client decrypts the response, verifies that the server has accepted the shared key, and then sends additional client information, such as a credit card number, to the server, using the shared key for encryption. The client may then use the shared key in a series of subsequent transactions with the server. The subsequent transactions may be in accordance with a data delivery protocol in which the client requests information, and the server supplies the information encrypted using the shared key. The server may require that the client demonstrate possession of the shared key before responding to a data delivery request. The generation and use of the shared key may be made substantially transparent to the client through the use of a client-side web proxy.

26 Claims, 3 Drawing Sheets

OTHER PUBLICATIONS

T. Ylonen, "SSH—Secure Login Connections Over the Internet," USENIX Workshop on Security, 1996.

P. Karlton, A. Freier and P. Kocher, "The SSL Protocol," 3.0 Internet Draft, Mar. 1996.

R. Rivest, "Perspectives on Financial Cryptography," Invited Lecture, Proc. of Financial Cryptography '97, Springer–Verlag.

Gabber, P. Gibbons, Y. Matias and A. Mayer, "How to Make Personalized Web Browsing Simple, Secure and Anonymous," Proceedings of Financial Cryptography '97, Springer–Verlag, 1997.

A. Aziz and M. Patterson, "Design and Implementation of SKIP (Simple Key Management for Internet Protocols)," Proceedings of the INET '95 Conference, 1995.

R. Rivest and A. Shamir, "Pay Word and MicroMint: Two Simple Micropayment Schemes," $4^{th}$ Cambridge Workshop on Security Protocols, 1996.

M. Bellare and P. Rogaway, "Entity Authentication and Key Distribution," Crypto '93 Proceedings, Springer–Verlag.

"SET: Secure Electronic Transaction Specification," Book 1: Business Description, Version 1.0, May 1997.

R. Rivest, "The MD5 Message Digest Algorithm," Internet–RFC 1321, Apr. 1992.

* cited by examiner

SIMPLIFIED SECURE SHARED KEY ESTABLISHMENT AND DATA DELIVERY PROTOCOLS FOR ELECTRONIC COMMERCE

FIELD OF THE INVENTION

The invention relates generally to electronic transactions over computer networks, and more particularly to techniques for ensuring security of electronic transactions without the need for key exchange or other complex arrangements for each transaction.

BACKGROUND OF THE INVENTION

Transaction security has become an increasingly important aspect of communication over the Internet and other types of wide area computer networks. A number of security techniques developed recently operate at the transport/session layer of a computer network operating in accordance with the Transmission Control Protocol/Internet Protocol (TCP/IP) standard. These techniques include the Secure HyperText Transport protocol (S-HTTP), described in E. Rescorla and A. Schiffman, "The Secure HyperText Transport Protocol," Internet Draft, draft-ietf-wts-shttp-00.txt, July 1995, the Secure Shell (SSH) protocol, described in T. Ylonen, "SSH—Secure Login Connections Over the Internet," USENIX Workshop on Security, 1996, and the Secure Socket Layer (SSL) protocol, described in P. Karlton, A. Freier and P. Kocher, "The SSL Protocol," 3.0, Internet Draft, March 1996. These and other security mechanisms implemented at the transport/session layer generally have the advantage of providing universal security "primitives" which have a wide applicability. For example, the SSL and SSH protocols can be used in conjunction with any TCP connection in the network. However, this universality comes at the expense of a lack of flexibility in the complexity and cost of transactions, and a lack of user mobility. More particularly, transactions which are within the same client-server relationship but execute at different times will generally appear to the network transport layer as unrelated transactions, or may require the storage of data in secure long-term memory at the client side.

Emerging applications in electronic commerce often involve very low-cost transactions, which execute in the context of an ongoing, extended client-server relationship. The increase in low-cost electronic transactions and the need for "low-cost crypto" is described in, for example, R. Rivest, "Perspectives on Financial Cryptography," Invited Lecture, Proc. of Financial Cryptography '97, Springer-Verlag. For these low-cost transactions, the above-noted general-purpose security mechanisms tend to be prohibitively expensive. In particular, both the S-HTTP and SSL security mechanisms involve a handshake-based key distribution which utilizes complex public key cryptography techniques. A user desiring to conduct a series of low-cost secure transactions with a vendor over the Internet is therefore required to utilize complex and costly arrangements, even though the transactions are carried out within an ongoing client-server relationship.

A need therefore exists for improved security techniques for electronic transactions, which take advantage of an ongoing client-server relationship to provide transaction security without the complexity and cost associated with conventional public key techniques.

SUMMARY OF THE INVENTION

The invention provides security protocols that are particularly well-suited for providing security in a series of low-cost transactions carried out between a client and a server within an on-going client-server relationship. In one embodiment of the invention, a novel simplified key establishment protocol (SKEP) is used to establish a shared key which may be used for the series of transactions. The client generates the shared key by computing, for example, the Janus function of (i) a client identifier, (ii) a server identifier and (iii) secret client information, encrypts the shared key using a public key of the server, and sends the encrypted shared key to the server. The server responds by incorporating server information into a response which is encrypted using the shared key and sent to the client. The client decrypts the response, verifies that the server has accepted the shared key, and then encrypts and sends additional client information such as a credit card number to the server using encryption based on the shared key. The server may in turn respond with an encrypted signature which may be used to provide a non-repudiation feature, such that the server cannot later deny having entered into the series of transactions with the client.

The client can use the shared key generated in accordance with the SKEP protocol in all of its subsequent transactions with the server, by simply recomputing the shared key via the Janus function. This eliminates the need for a separate key exchange for each transaction, and also eliminates the need to store shared keys between different transactions. The invention thereby considerably reduces the complexity and cost associated with providing secure client-server communications over the Internet and in numerous other applications. Moreover, because the client need not rely on data stored in secure memory, the security techniques of the invention are well-suited for use in mobile computing applications.

The subsequent client-server transactions may be conducted in accordance with a simplified or extended data delivery protocol (SDDP or EDDP) based on the above-described shared key. In the SDDP protocol, the client requests information, and the server supplies the information encrypted using the shared key. The client sends certain additional information, such as a random nonce, with its data delivery request, such that the client can readily verify that the response is associated with that request. The EDDP protocol operates in a similar manner, but requires that the client demonstrate possession of the shared key to the server before the server responds to a data delivery request, and also prevents third parties from determining the type of information requested by the client.

The generation and use of a shared key in accordance with the invention may be made substantially transparent to the client through the use of a client-side web proxy. The web proxy may, for example, query the client for its identifier and secret information at the beginning of a browsing session and then use the identifier and secret information to generate session keys for each server the client interacts with during the browsing session. After a given shared key is established, the web proxy automatically regenerates the shared key each time the client initiates a transaction with the corresponding server. In this manner, the use of the shared key can be made substantially transparent to the client, and the storage and computation overheads associated with the use of the shared key are minimized.

DETAILED DESCRIPTION OF THE INVENTION

The present invention will be illustrated below in conjunction with a number of exemplary security protocols. It should be understood, however, that the invention is more generally applicable to any type of electronic transaction or other communication in which it is desirable to provide security without the complexity associated with conventional public key cryptography. Although particularly well-suited for use with communications over the Internet or other computer networks, the invention can also be applied to numerous other secure transaction applications, including applications based on smart cards. The term "web proxy" as used herein is intended to include, for example, any program or other device which serves as an intermediary between a browser or other user program and a web server, and through which information configured in accordance with the Hypertext Transfer Protocol (HTTP) is routed. A web proxy in accordance with the invention may, for example, run on a client processor, on a server within an "intranet" associated with the client or on any other suitable processor arranged to communicate with the client. The term "random nonce" is intended to include a non-repeating value which appears substantially random to any entity other than the entity which generated it.

Figure 1:
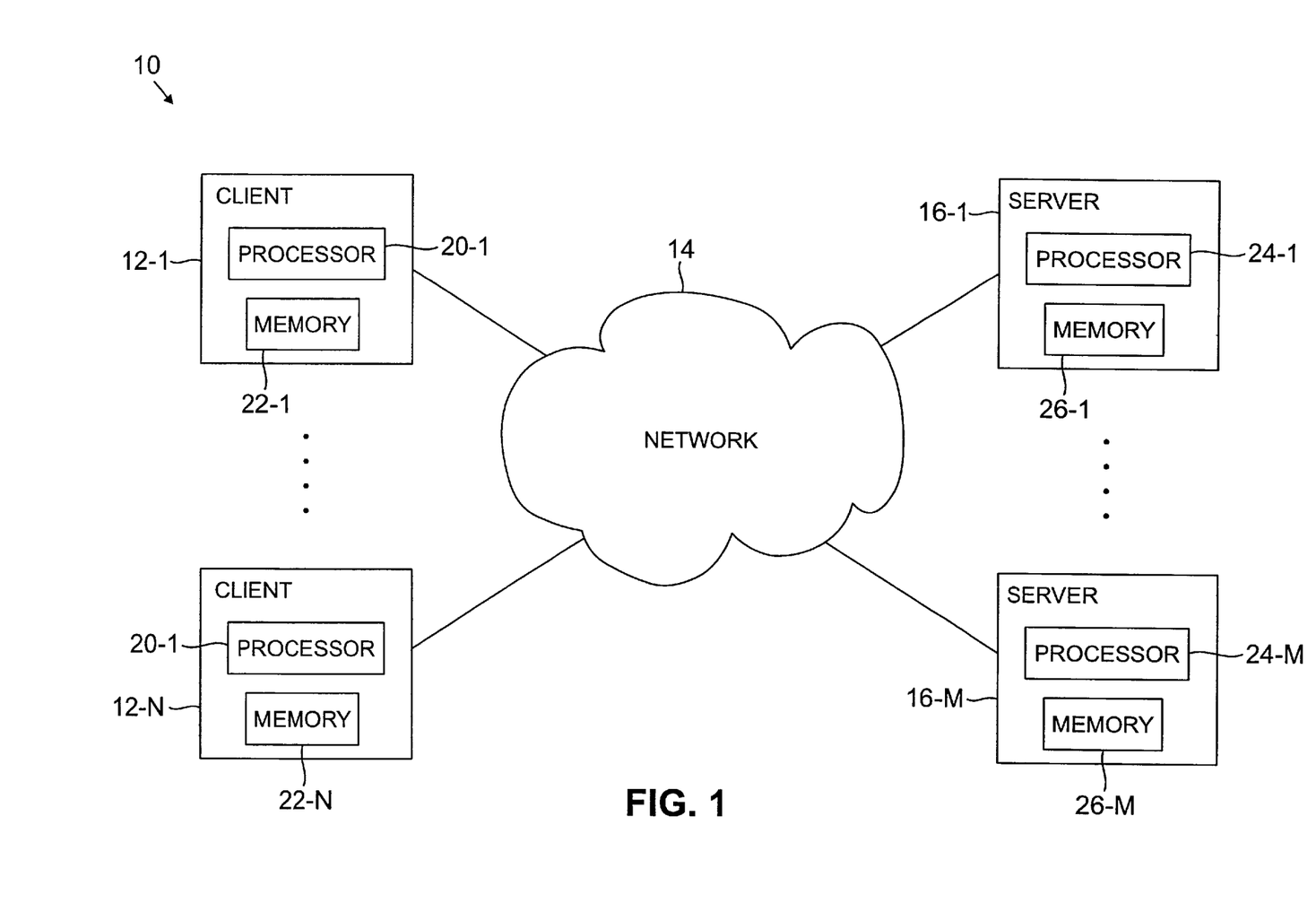
FIG. 1 shows an exemplary system in which the transaction security techniques of the present invention may be implemented.

FIG. 1 shows an exemplary system 10 in which electronic transaction security may be implemented in accordance with the invention. The system 10 includes a number of clients 12-i, i=1, 2, ... N connected to a network 14. A number of servers 16-j, j=1, 2, ... M, are also connected to the network 14. Each of the clients 12-i includes a processor 20-i coupled to a memory 22-i, and each of the servers 16-j includes a processor 24-j coupled to a memory 26-j. One or more of the clients 12-i and servers 16-j may be implemented as a personal, micro or mainframe computer, a computer workstation, or other digital data processor as well as various portions or combinations thereof. The processors 20-i and 24-j may represent a microprocessor, a central processing unit, an application-specific integrated circuit (ASIC) or other suitable processing circuitry. The memories 22-i and 26-j may be electronic, magnetic or optical memories. The network 14 may be a local area network, a metropolitan area network, a wide area network, a global data communications network such as the Internet, a private "intranet" network or any other suitable data communication medium. The clients 12-i and servers 12-j execute software programs which provide security for electronic transactions in a manner to be described in conjunction with FIGS. 2 through 5 below.

The transaction security techniques of the present invention are based on "persistent" shared keys, which are established between a client and a server and persist for the duration of a client-server relationship. It will be shown below that these techniques are well suited for securing low-cost transactions which repeatedly execute between a client and a server. Examples of applications which involve these low-cost transactions may include delivery of personalized information by a vendor via a web page, secure subscriptions to various types of information (e.g., personalized stock quotes which a vendor sends to a client on a daily or hourly basis), payment transactions involving banks or other financial institutions, and delivery of client receipts which are provable to third parties. In accordance with the invention, a client-side web proxy may be used to compute secure shared keys on behalf of a given client. The computation may be based on a server identifier, a client identifier, and a single secret piece of information provided by the client. The shared keys are allowed to persist between browsing sessions of the client. However, the client need not store any shared keys, or any other security information. Instead, the persistent shared key may be recomputed by the web proxy when required, and in a manner which is transparent to the client. A server accepts and stores the shared key generated by a client on their first interaction. This shared key storage can be easily integrated into an otherwise conventional client record which is typically stored at the server. The modular structure of the security techniques of the present invention allows the complexity and cost of securing a transaction to be adjusted in accordance with the importance and monetary value of the transaction.

The above-described properties indicate that a client need not rely on data stored in its memory, and the security techniques of the invention are therefore suitable for mobile computing applications. The above-noted web proxy that operates on behalf of the client is not required to maintain any information about the client. Therefore, the client can use various instances of the web proxy interchangeably. For example, different copies of the same web proxy may be used on a personal computer and a laptop computer associated with a given client. The client can then transparently continue interacting with a given server when switching from the personal computer to the laptop computer.

The invention may be implemented using a very simple client interface. In a first interaction with the web proxy, such as when starting to run a browser program, the client provides an identifier, such as an e-mail address, and an additional secret piece of information. The client can subsequently reconnect transparently to any server which has appropriate session information. The invention does not require a client to obtain and maintain its own public and private keys or certificates. The client information can be stored on a smart card or in a secure file and then submitted to the web proxy automatically on behalf of the client. The invention gains computational efficiency by minimizing the use of public key cryptography techniques.

The client-side shared key generation aspects of the invention will now be described in greater detail. In an illustrative embodiment, it is up to the client to compute a different persistent shared key for each server with which the client interacts. The servers will also be referred to herein as vendors. The client submits to a given vendor a client identifier, such as an e-mail address, and a shared key, which are to be used by both parties during their subsequent interactions. The shared key is private and should be protected during communication. Therefore, before sending the shared key to the vendor, the client uses a public key of the vendor to encrypt the shared key. Public key encryption is thus utilized only during the initial interaction with a vendor. After this first exchange, both the client and the vendor can use the shared key in their subsequent interactions to authenticate and encrypt data with low computational cost.

An important aspect of the invention is the manner in which the client computes the persistent shared key. An exemplary shared key may be computed as a function of three arguments: (1) a client identifier, such as an e-mail address; (2) a single piece of secret information provided by the client; and (3) a vendor identifier, such as the domain name in the Universal Resource Locator (URL) of the vendor. In an illustrative embodiment of the invention, the function computes a string having the following desirable properties, with respect to an adversary with polynomially bounded computational power: (1) secrecy, in that the resulting string is indistinguishable from a random string; (2) consistency, in that the computed shared key for a given vendor is consistent; (3) efficiency, in that the computation of the shared key is efficient; (4) modular security, in that knowing the shared keys of the client for some vendors cannot help an adversary in guessing the shared key for another vendor; and (5) impersonation resistance, in that given a vendor and a client, an adversary cannot do better than guessing the client identifier and the secret piece of information. Alternative embodiments of the invention may utilize other functions which provide only a subset of these properties, or other desirable properties not listed above.

As noted previously, the shared key computation may be performed transparently on behalf of the client by a web proxy. The web proxy may be running on the client processor, or alternatively on a different computer with which the client has trusted communication, such as a server within an intra-net of the client. Upon the first interaction of the client with the web proxy, such as when starting a browser program, the client provides the above-noted single secret piece of information, which the proxy uses thereafter to compute a shared key for each vendor the client interacts with during that browsing session. It will be assumed for purposes of illustration herein that the term "client" can include a user, the browser program or other user interface, user-assisting programs such as plug-ins to the browser, and the web proxy. A reference to a client computing or executing an operation in the illustrative examples should be understood to include without limitation the computation or execution by the web proxy. A reference to a client supplying input should be understood to include without limitation the user supplying the input through the user-assisting programs, or a user-assisting program supplying the input on behalf of a user.

An illustrative embodiment of the invention uses the Janus function J for the client-side computation of shared keys. The Janus function J is defined in the context of personalized, anonymous interaction in U.S. patent application Ser. No. 08/787,557, filed Jan. 22, 1997 and entitled "System and Method for Providing Anonymous Personalized Browsing in a Network," which is incorporated by reference herein. The function J is based on pseudo-random functions and collision-resistant hash functions, as described in O. Goldreich, S. Goldwasser and S. Micali, "How to Construct Random Functions," Journal of the ACM, Vol. 33, No. 4, pp. 210–217, 1986 and A. Menezes, P. Van Oorschot and S. Vanstone, "Handbook of Applied Cryptography, CRC Press, 1997, respectively, both of which are incorporated by reference herein. Let h be a collision-resistant hash function and let $f_k$ be a pseudo-random function chosen from a set F, of pseudo-random functions using k as a seed. Let $\|$ denote concatenation and $\oplus$ denote exclusive or. Let $id_c$ denote the client identifier and $id_v$ denote the vendor identifier. Finally, let $s_c$ denote the piece of secret information of the client. It will be assumed for simplicity that $s_c$ comprises the concatenation of two strings, such that $s_c = s_c^1 \| s_c^2$. The Janus function J is then defined as follows:

$$r_{id_V} = f_{s_c^1}(id_V)$$

$$J(id_C, id_V, s_C) = h(r_{id_V} \| (f_{s_c^2}(r_{id_V} \oplus id_C))$$

Additional details regarding the Janus function J and its implementation in a web proxy may be found in E. Gabber, P. Gibbons, Y. Matias and A. Mayer, "How to Make Personalized Web Browsing Simple, Secure and Anonymous," Proceedings of Financial Cryptography '97, Springer-Verlag, 1997, which is incorporated by reference herein.

A vendor stores a given client identifier and the corresponding shared key, and possibly additional data such as client preferences, on the first interaction with the client. The vendor can then retrieve the corresponding key upon being presented with the stored client identifier on a subsequent interaction. A number of illustrative protocols for establishing persistent shared keys, and for subsequent interaction between a client and a server, will be described in conjunction with FIGS. 2 through 5. In the following description, $E_K(x)$ will denote the encryption of a plaintext message x with a public key K, and $S_k(x)$ will denote the signature of x with a private key k. It will be assumed for purposes of illustration that a given client can obtain a certified public key for each vendor. $Enc_K(x)$ will denote a symmetric encryption of the plaintext message x with a shared key K, and $MAC_K$ will denote a message authentication with the shared key K. If two parties A and B have a shared key $K = (K_1, K_2)$, $EMAC_K(x) = Enc_{K_1}(x) \| MAC_{K_2}(Enc_{K_1}(x)))$ is a basic secure communication step between A and B that enables delivery of an encrypted authenticated plaintext message x.

Figure 2:
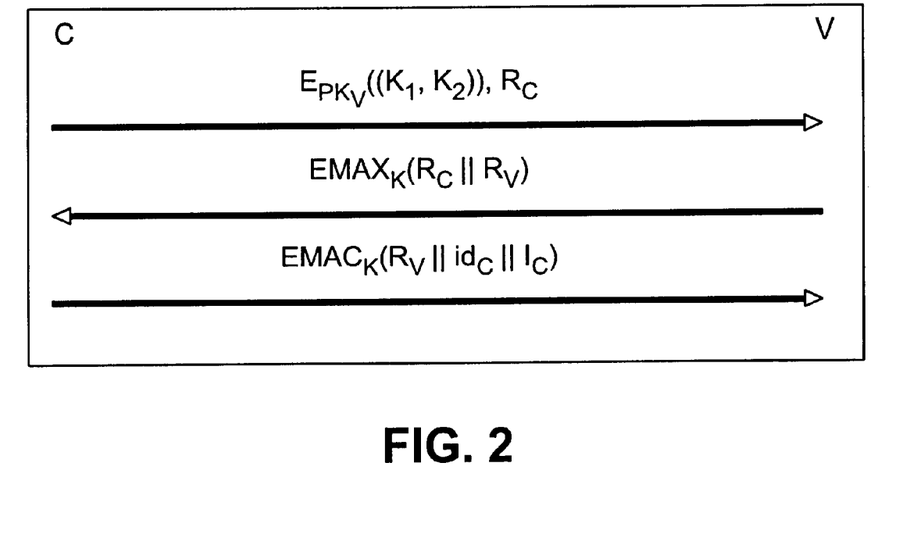
FIG. 2 illustrates an exemplary simple key establishment protocol (SKEP) in accordance with the invention.

FIG. 2 illustrates the operation of a simple key establishment protocol (SKEP) in accordance with the invention. The SKEP protocol may be used when a client C requests to register or subscribe at a vendor V for the first time. The diagram in FIG. 2 indicates the flow of information between client C and vendor V. The client C first computes a persistent shared key $K = (K_1, K_2)$ as the Janus function $J(id_C, s_C, id_V)$ in the manner previously described. The component $K_1$ of shared key K will be used for encryption, and the component $K_2$ will be used for authentication. The client C then sends a message of the form $E_{PK_V}(K) \| R_C$ to vendor V, where $E_{PK_V}(K)$ is the persistent shared key K encrypted using the public key $PK_V$ of the vendor V, and $R_C$ is a random nonce. The vendor V then decrypts $E_{PK_V}(K)$ to obtain the shared key K. The vendor V then replies as shown in FIG. 2 with $EMAC_K(R_C \| R_V)$, where $R_V$ is a random nonce of the vendor. The client C decrypts this message, verifies the MAC and its own random nonce $R_C$, and sends the message $EMAC_K (R_V \| id_C \| I_C)$ to vendor V, where $I_C$ contains possible subscription data, such as a credit card number, start date, expiration date, and so on. The vendor V decrypts the message, verifies the MAC, compares $R_V$ to what it sent earlier, and stores the client identifier $id_C$ and the data $I_C$ in a record established for client C. The client C and vendor V have thus established a persistent shared key K which may be used for multiple low-cost transactions without further use of public key cryptography techniques.

It can be shown that the SKEP protocol illustrated in FIG. 2 provides a number of desirable features to the client, including: (1) key authentication, that is, assurance that no party other than the intended party can gain access to the shared key; (2) entity authentication, that is, assurance of the identity of the intended other party and knowledge that the intended other party actually participated in the transaction; and (3) key confirmation, that is, assurance that the intended other party is in possession of the shared key. The SKEP protocol also provides key confirmation and entity authentication to the vendor, in that the vendor can be assured that it interacts with a party which actually possesses the persistent shared key K and valid identifying information such as a valid credit card number. Although this vendor assurance is weaker than the assurance provided to the client by the certified public key of the vendor, it is consistent with the vendor assurances currently accepted by many popular web sites.

Figure 3:
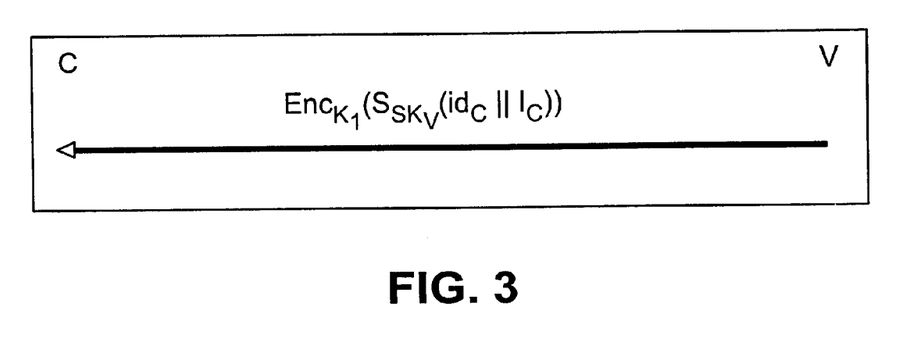
FIG. 3 shows an extension to the key establishment protocol of FIG. 2 which allows a client to obtain a receipt which is provable to a third party.

FIG. 3 shows an additional message which may be sent from the vendor V to the client C in order to provide a non-repudiation property in the SKEP protocol. The non-repudiation property allows the client to obtain a receipt, provable to a third party, of its transaction with the vendor, such that the vendor cannot later deny having conducted the transaction with the client. As shown in FIG. 3, the vendor V, after receiving the last message of the basic SKEP protocol of FIG. 2, sends a message which includes a vendor signature on the client identifier $id_C$ and the transaction data $I_C$, encrypted using the $K_1$ portion of the shared key K. The message is given by $Enc_{K1}(S_{SKV}(id_C\|I_C))$, where $S_{SKV}$ is a signature generated using the secret key of the vendor V. The client C can decrypt the message using the $K_1$ portion of the shared key K, and a third party can verify that the signature is indeed that of the vendor V.

Figure 4:
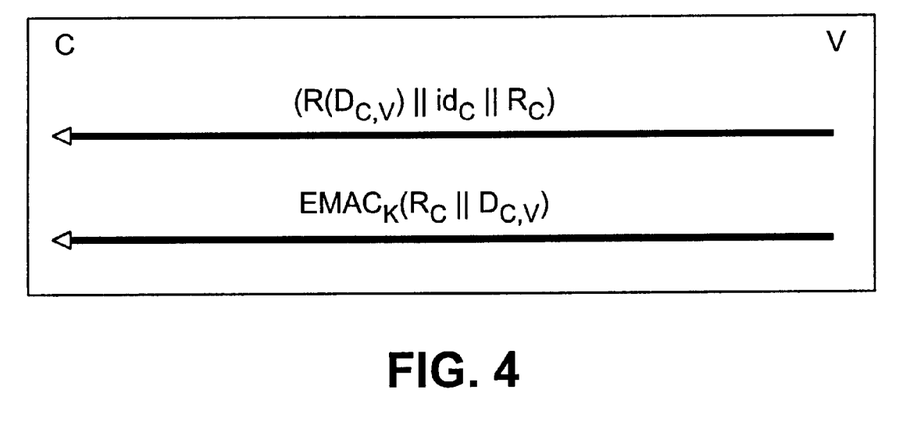
FIG. 4 illustrates an exemplary simple data delivery protocol (SDDP) which provides privacy of data, source authentication and data integrity.

FIG. 4 illustrates an exemplary simple data delivery protocol (SDDP) in accordance with the invention. The SDDP protocol is used in this example when the client C requests information $D_{C,V}$ from the vendor V. As shown in FIG. 4, the client C sends a request $R(D_{C,V})$ to the vendor V, along with the client identifier $id_C$ and the random nonce $R_C$. The vendor V attempts to locate a previously-established shared key K associated with the client identifier $id_C$. If the shared key K is found, and the corresponding stored information $I_C$ indicates that the client account is valid, the vendor V responds with a message $EMAC_K(R_C\|D_{C,V})$. The client decrypts this message using the shared key K to obtain the requested information $D_{C,V}$, checks that the random nonce $R_C$ is unchanged from the value submitted previously by vendor V, and verifies the MAC. It can be shown that the illustrative SDDP protocol of FIG. 4 provides privacy of data, source authentication of the vendor V to client C, and data integrity of the requested information $D_{C,V}$. However, it should be noted that the SDDP protocol provides no real source authentication to the vendor. As a result, the vendor could be prompted via impersonation attacks to send data, even though the data might not be readable by the requesting entity, thereby creating a potential problem in terms of denial of service. An alternative protocol to be described in conjunction with FIG. 5 below alleviates this potential problem with the SDDP protocol of FIG. 4.

Figure 5:
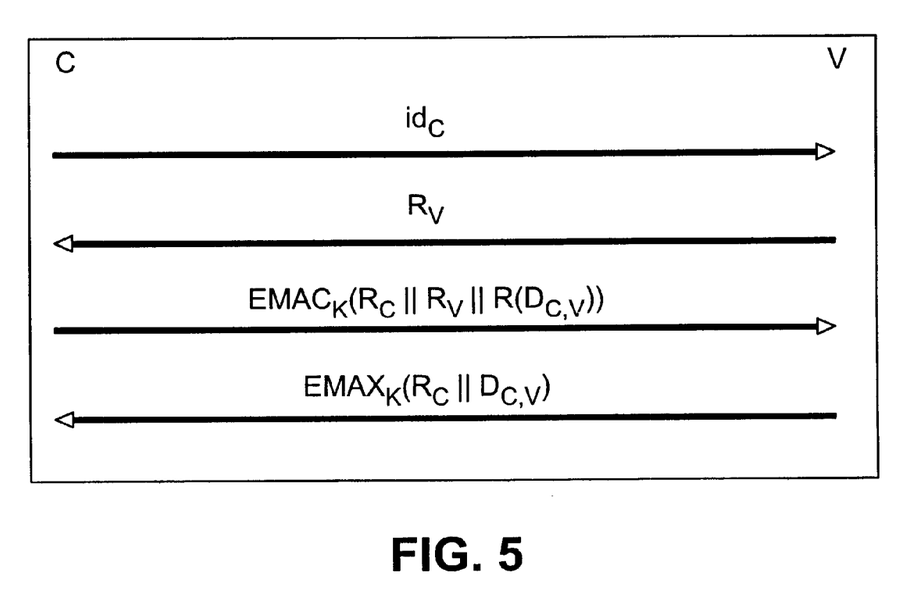
FIG. 5 illustrates an extended data delivery protocol (EDDP) in which a client demonstrates possession of a shared key before data is delivered.

FIG. 5 shows an exemplary extended data delivery protocol (EDDP) in accordance with the invention. The EDDP protocol is similar to the SDDP protocol previously described, but requires the client C to demonstrate possession of the appropriate shared key to the vendor V before the vendor will deliver the requested information, and also hides from third parties the type of information the client has requested. The client C sends the client identifier $id_C$ to the vendor V. The vendor V determines if the identifier $id_C$ corresponds to a legitimate client, and examines the stored information $I_C$ to ensure that the client account is valid. If these checks are passed, the vendor V replies with a message $R_V$, where $R_V$ is a random nonce of the vendor V. The client C checks that the random nonce $R_V$ is unchanged, and then replies with $EMAC_K(R_C\|R_V R(D_{C,V}))$ as shown, where $R_C$ and $R(D_{C,V})$ are a random nonce and information request, respectively, of the client. The vendor V decrypts using the shared key, verifies the MAC and checks that $R_V$ is unchanged. The vendor V then replies with a message $EMAC_K(R_C\|D_{C,V})$. The client C decrypts this message using the shared key K to obtain the requested information $D_{C,V}$, again checks that the random nonce $R_C$ remains unchanged from the value submitted previously by vendor V, and verifies the MAC. In addition to the above-described properties of the SDDP protocol, the EDDP protocol provides mutual authentication before any data is exchanged and therefore provides better protection against the above-noted denial of service attacks. In addition, as previously noted, the information request itself is encrypted and therefore third parties are unable to determine what type of information the client has requested. Furthermore, the shared key is better protected, since only the corresponding client can prompt the vendor to use it for encryption and authentication.

The above-described protocols are suitable for use in a wide variety of applications. For example, the protocols may be used in an application in which the vendor V may operates an Internet web site which provides free personalized stock quotes. In this case, the requested information $D_{C,V}$ may be a personalized web page containing a set of stock quotes for a given client C, the client identifier $id_C$ is its email address, and the transaction data $I_C$ is empty. The SKEP protocol is used to establish a shared key, and the SDDP protocol may be used to supply the requested information. In an application is which a client C purchases a subscription to personalized stock quotes from the vendor V, the client identifier $id_C$ is again its email address, and the transaction data $I_C$ includes the client credit card data and the duration of the subscription. Non-repudiation key exchange in accordance with FIGS. 2 and 3 is appropriate in this case, given that it allows a client to use the vendor signature as a receipt. The EDDP protocol is preferable for delivering the data in this case, as the service is restricted to paying clients and thus the vendor would like to provide adequate service for these clients in the presence of a denial of service attack.

The security protocols of the invention exhibit minimal computation and memory costs. In the illustrative protocols, the vendor signs no more than a single message per client. All subsequent communication is performed via encryption/MAC. The client has to public key encrypt a single message per vendor upon first interaction, and uses only MAC processes in subsequent interactions with a given vendor. In addition, the client computes one Janus function per browsing session and vendor. The client therefore does not require any long-term memory resources to implement the protocols. The vendor stores a persistent shared key K for each of its clients. Given that the vendor already stores some information about each of its clients, the additional storage attributable to the shared key is not place any significant extra burden on the vendor.

Alternative embodiments of the invention may avoid exposing a persistent shared key by replacing it with a fresh session key for every transaction. Such a session key could be computed locally by both the client and the vendor, and may be based on the persistent shared key and a counter. Additional details regarding session key generation of this type may be found in, for example, A. Aziz and M. Patterson, "Design and Implementation of SKIP (Simple Key Management for Internet Protocols)," Proceedings of the INET '95 Conference, 1995, which is incorporated by reference herein. Other embodiments of the invention may make use of the receipt techniques described in R. Rivest and A. Shamir, "PayWord and MicroMint: Two Simple Micropayment Schemes," $4^{th}$ Cambridge Workshop on Security Protocols, 1996, which is incorporated by reference herein, to resolve situations in which, for example, a client complains of paying the vendor but never receiving the requested information and a third party is unable to determine if the vendor is indeed at fault. Additional details regarding incorporation of security protocols such as those described herein into a protocol such as HTTP can be found in E. Gabber and A. Silberschatz, "Agora: A Minimal Distributed Protocol for Electronic Commerce," Second USENIX Workshop on Electronic Commerce, 1996, which is incorporated by reference herein.

The above-described embodiments of the invention are intended to be illustrative only. Numerous alternative embodiments within the scope of the following claims will be apparent to those skilled in the art.

What is claimed is:

1. A method of secure communication between a client and a server, comprising:

encrypting a shared key, generated in association with the client, using a public key associated with the server;

sending the encrypted shared key to the server;

receiving a response from the server incorporating information encrypted using the shared key; and verifying acceptance of the shared key by the server, using the information in the response;

wherein said accepted shared key is recomputed in association with the client for use in an on-going client-server relationship which comprises one or more subsequent transactions between the client and the server, such that a separate key exchange for each transaction need not be performed and the accepted shared key need not be stored in association with the client between said transactions, and such that the use of said accepted shared key persists during the course of the on-going client-server relationship;

further wherein the accepted shared key persists for a time period substantially larger than a related transaction time period associated with a secure socket layer (SSL) protocol thereby allowing the accepted shared key to persist for at least two transactions separated by a time period substantially larger than the SSL related transaction time period, and wherein the client, during subsequent transactions, is able to use a communication device that is different than a communication device used during the key exchange.

2. The method of claim 1 wherein the server stores the accepted shared key and an identifier of the client on an initial interaction with the client, and then retrieves the shared key upon being presented with the stored client identifier in a subsequent transaction.

3. The method of claim 1 further including the step of sending additional client information from the client to the server if the information received in the response is verified as associated with the server.

4. The method of claim 1 wherein an additional message is sent from the server to the client in order to provide a non-repudiation property for a transaction based on the accepted shared key, wherein the additional message includes a vendor signature on client information.

5. The method of claim 1 further including the steps of:

sending a request to the server along with a client identifier;

receiving a response to the request from the server, wherein the response is encrypted using the accepted shared key; and decrypting the response using the accepted shared key, to thereby authenticate the response and obtain the requested information.

6. The method of claim 5 further including the step of requiring the client to demonstrate possession of the accepted shared key before providing the requested information.

7. The method of claim 1 further including the step of generating the shared key at the client as a function of an identifier of the client, an identifier of the server, and secret information associated with the client.

8. The method of claim 7 wherein the function is a Janus function.

9. The method of claim 1 further including the step of generating the shared key in a web proxy associated with the client.

10. The method of claim 9 wherein all long-term memory utilized by the web proxy is unsecure.

11. The method of claim 9 wherein the client utilizes a plurality of web proxies during the course of the on-going client-server relationship.

12. The method of claim 9 wherein the accepted shared key is regenerated by the web proxy when required for a subsequent transaction between the client and the server, in a manner which is substantially transparent to the client.

13. The method of claim 9 wherein in an initial interaction with the web proxy the client provides a client identifier and additional secret information used by the web proxy to generate the shared key.

14. The method of claim 13 wherein the web proxy uses the client identifier and secret information provided in the initial interaction to compute a shared key for each of a plurality of servers with which the client interacts during a browsing session.

15. An apparatus for use in providing a secure communication between a client and a server, comprising:

at least one processor associated with the client and operative: (i) to encrypt a shared key, generated in association with the client, using a public key associated with the server, (ii) to send the encrypted shared key to the server, (iii) to receive a response from the server incorporating information encrypted using the shared key, and (iv) to verify acceptance of the shared key by the server using the information in the response, wherein said accepted shared key is recomputed for use in an on-going client-server relationship which comprises one or more subsequent transactions between the client and the server, such that a separate key exchange for each transaction need not be performed and the accepted shared key need not be stored in association with the client between said transactions, and such that the use of said accepted shared key persists during the course of the on-going client-server relationship, further wherein the accepted shared key persists for a time period substantially larger than a related transaction time period associated with a secure socket layer (SSL) protocol thereby allowing the accepted shared key to persist for at least two transactions separated by a time period substantially larger than the SSL related transaction time period, and wherein the client, during subsequent transactions, is able to use a communication device that is different than a communication device used during the key exchange; and a memory coupled to the processor for at least temporarily storing at least a portion of the information in the response.

16. The apparatus of claim 15 wherein the server stores the accepted shared key and an identifier of the client on an initial interaction with the client, and then retrieves the shared key upon being presented with the stored client identifier in a subsequent transaction.

17. The apparatus of claim 15 wherein the processor generates the shared key as a function of an identifier of the client, an identifier of the server, and secret information associated with the client.

18. The apparatus of claim 17 wherein the function is a Janus function.

19. The apparatus of claim 15 wherein the processor is further operative to generate the shared key using a web proxy associated with the client.

20. The apparatus of claim 19 wherein all long-term memory utilized by the web proxy is unsecure.

21. The apparatus of claim 19 wherein the client utilizes a plurality of web proxies during the course of an on-going client-server relationship.

22. The apparatus of claim 19 wherein the accepted shared key is regenerated by the web proxy when required for a subsequent transaction between the client and the server, in a manner which is substantially transparent to the client.

23. The apparatus of claim 19 wherein in an initial interaction with the web proxy the client provides a client identifier and additional secret information used by the web proxy to generate the shared key.

24. The apparatus of claim 23 wherein the web proxy uses the client identifier and secret information provided in the initial interaction to compute a shared key for each of a plurality of servers with which the client interacts during a browsing session.

25. A method of secure communication between a client and a server, comprising:

receiving in the server an encrypted shared key, wherein the shared key is generated in association with the client and encrypted using a public key associated with the server;

generating a response incorporating information encrypted using the shared key; and transmitting the response to the client, wherein the client uses the information in the response to verify acceptance of the shared key by the server; and wherein the accepted shared key is recomputed for use in an on-going client-server relationship which comprises one or more subsequent transactions between the client and the server, such that a separate key exchange for each transaction need not be performed and the accepted shared key need not be stored in association with the client between said transactions, and such that the use of said accepted shared key persists during the course of the on-going client-server relationship;

further wherein the accepted shared key persists for a time period substantially larger than a related transaction time period associated with a secure socket layer (SSL) protocol thereby allowing the accepted shared key to persist for at least two transactions separated by a time period substantially larger than the SSL related transaction time period, and wherein the client, during subsequent transactions, is able to use a communication device that is different than a communication device used during the key exchange.

26. An apparatus for use in providing secure communication between a client and a server, comprising:

a processor associated with the server and operative: (i) to receive an encrypted shared key, wherein the shared key is generated in association with the client and encrypted using a public key associated with the server, and (ii) to generate and transmit to the client a response incorporating information encrypted using the shared key, wherein the client can verify acceptance of the shared key by the server using the information in the response, and the accepted shared key is recomputed for use in an on-going client-server relationship which comprises one or more subsequent transactions between the client and the server, such that a separate key exchange for each transaction need not be performed and the accepted shared key need not be stored in association with the client between said transactions, and such that the use of said accepted shared key persists during the course of the on-going client-server relationship, further wherein the accepted shared key persists for a time period substantially larger than a related transaction time period associated with a secure socket layer (SSL) protocol thereby allowing the accepted shared key to persist for at least two transactions separated by a time period substantially larger than the SSL related transaction time period, and wherein the client, during subsequent transactions, is able to use a communication device that is different than a communication device used during the key exchange; and a memory coupled to the processor for storing the shared key.

\* \* \* \* \*